United States Patent [19]
Arakawa et al.

[11] 3,950,267
[45] Apr. 13, 1976

[54] PROCESS FOR PRODUCING ACTIVATED CARBON

[75] Inventors: Hideo Arakawa; Tatsuo Hasebe, both of Tokyo; Shigeru Sato, Kashiwa, all of Japan

[73] Assignees: Japan Eng. Co., Ltd., Tokyo; Nippon Iron Powder Co., Ltd., Kashiwa, both of Japan

[22] Filed: Dec. 6, 1973

[21] Appl. No.: 422,417

[30] Foreign Application Priority Data
Dec. 12, 1972 Japan.............................. 47-123974

[52] U.S. Cl. .................. 252/425; 75/36; 75/62; 75/71; 75/72; 75/77; 75/80; 75/82; 75/85; 75/86; 201/32; 252/422; 252/444; 252/445; 423/449

[51] Int. Cl.²................... C01B 31/12; C01B 31/10; C21B 13/08

[58] Field of Search................... 252/422, 425, 445; 423/449, 445; 201/27, 32, 33; 75/34–37

[56] References Cited
UNITED STATES PATENTS

| | | | |
|---|---|---|---|
| 1,502,592 | 7/1924 | Saver................................. | 252/422 |
| 2,107,549 | 2/1938 | Schmalfeldt........................... | 75/36 |
| 2,180,735 | 11/1939 | Hamister............................. | 252/445 |
| 2,269,465 | 1/1942 | Lykken............................... | 423/449 |
| 2,593,398 | 4/1952 | Kalling.................................. | 75/36 |
| 3,080,156 | 3/1963 | Freeman................................ | 75/36 |
| 3,617,256 | 11/1971 | Joseph et al. .......................... | 75/36 |
| 3,770,417 | 11/1973 | Kranz..................................... | 75/36 |
| 3,881,916 | 5/1975 | Serbent et al........................... | 75/36 |

*Primary Examiner*—Winston A. Douglas
*Assistant Examiner*—P. E. Konopka
*Attorney, Agent, or Firm*—Kenyon & Kenyon

[57] ABSTRACT

High quality activated carbon is produced by charging a mixture of an organic material such as wood, anthracite coal, brown coal, coconut husk, and a material containing metal oxide, metal carbonate or metal hydroxide, such as iron ore and lime, into an internal heating rotary furnace, preferably, having an internal space with a length of 1 to 10 times the diameter thereof, through an end of the rotary furnace, blowing air or oxygen gas into the internal space through an opposite end thereof, burning the distilled gas from the organic material and carbon monoxide generated by the reaction of the organic material with the metal oxide, carbonate or hydroxide, and uniformly circulating the burnt gas in the internal space to maintain the internal space at the reduction temperature.

13 Claims, No Drawings

PROCESS FOR PRODUCING ACTIVATED CARBON

The present invention relates to a process for producing activated carbon, more particularly, relates to a process for producing activated carbon with the simultaneous production of a reduced metal or reduced metal oxide.

It is well-known that the activated carbon is produced by carbonizing an organic material, for example, wood, coal, forest mill waste, coconut husk and saw dust, and activating the carbonized material. Generally, the activation of the carbonized material is carried out using, as an activating agent, chemicals such as zinc chloride, sodium sulfate and sodium phosphate, or gases such as steam and carbon dioxide.

The activation by the chemicals is utilized for the production of finely powdered activated carbon. In this method, the finely divided organic material such as saw dust and chipper waste, is preliminarily impregnated with an aqueous solution of the activating agent, and the impregnated organic material is carbonized and successively activated in a vertical furnace, horizontal furnace or fluidizing bed furnace or on a heating plate. Such method, however, has the following disadvantages.

1. A portion of the activating agent is oxidized and vaporized during the carbonization of the organic material.
2. It is necessary to recover the vaporized compound by way of showering.
3. It is necessary to remove the activating agent and ash remaining on the activated carbon by a wet process including washing with an acid solution, rinsing with water and neutralizing with an alkaline solution.

The above-mentioned recovery requires a long processing time results in a product of high cost.

In order to produce the activated carbon by way of activation by the gas, the organic material is first carbonized by heating at a high temperature while distilling volatile substances from the organic material, and an oxidizing activating gas, such as steam, carbon dioxide gas and air, is brought into contact with the carbonized material while burning a portion of the carbonized material. The conventional fluidizing bed furnace, external heating furnace and internal heating furnace may be used for the activation by the gas.

Generally, it is believed that in order to obtain activated carbon having an excellent absorbing capacity by way of activation by the gas, it is important that the organic material is carbonized over a relatively long time and that the carbonized material is brought into contact with a relatively small amount of the activating gas at a suitable temperature. The above-mentioned heat treatment of the organic material can be advantageously carried out by using a rotary furnace. However, it should be noted that the carbonized material formed in the conventional rotary furnace is difficult to directly bring into contact with the oxidizing activating gas, because the carbonized material is surrounded by a reducing, gas carbon monoxide. In order to eliminate the above-mentioned difficulty, one or a plurality of pipes for blowing the activating gas is inserted into the furnace, and the activating gas is blown onto the layer of the activated material. However, the above-mentioned blowing of the activating gas is unsatisfactory to sufficiently bring the activating gas into contact with the carbonized material. Accordingly, the activation of the carbonized material by the activating gas requires a long time. That is, the conventional activation by the gas has the following disadvantages.

1. Low heat efficiency,
2. Complexity of the furnace for the activation by the gas, and
3. Large loss of the carbonized material during the activation.

Further, it should be noted that in the activation of the carbonized material by the activating gas, steam or carbon dioxide, the following reaction takes place.

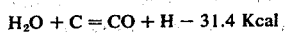

$$H_2O + C = CO + H - 31.4 \text{ Kcal}$$

or

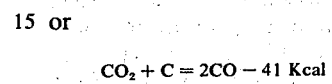

$$CO_2 + C = 2CO - 41 \text{ Kcal}$$

That is, the above reactions are heat-absorbing reactions. Because of the above heat-absorption during the activation, it is obvious that a large amount of heat must be supplied to the carbonized material to maintain it in an activating condition. For this purpose, an external heating rotary furnace is widely utilized. In the external heating rotary furnace, the heat is supplied through a jacket surrounding the rotary furnace. Generally, the activation of the carbonized material by the oxidizing activating gas is accomplished at a temperature of 700° to 950°C. Accordingly, it is necessary to make the jacket of the rotary furnace from a high heat-resistant steel, which is very expensive. Further, the external heating rotary furnace must be provided with a combustion furnace to generate a high temperature gas to heat the furnace. Such combustion furnace consumes a large amount of fuel, which results in the activation of the carbonized material being costly, and the price of the product is, therefore, high. If a internal heating rotary furnace is used instead of the external heating rotary furnace, the layer of the carbonized material to be activated is exposed to air or oxygen which is fed into the furnace to burn the distilled gas from the organic material and a portion of the organic material or an oxidizing mixture of the burnt gas and air or oxygen. This results in undesirable oxidation of the carbonized material. Such oxidation causes a low quality and a low yield of the resultant activated carbon.

U.S. Pat. No. 3,617,256 discloses a process for producing iron from iron ore by reduction with carbon at a temperature below the melting point of the irons. In the process, a carbonaceous reductant is preliminarily prepared from a coal below the rank of anthracite and, thereafter, bringing it into contact with the iron ore. By the reaction of the iron ore and the carbonaceous reductant, the iron ore is reduced to iron either in the form of powder or as an open-pored easily powdered agglomerate of such a powder and the carbonaceous reductant is converted to activated carbon. The above process is effected by utilizing an apparatus including a plurality of vessels for preparing the carbonaceous reductant, a combustion chamber for producing a high temperature gas and a multi-hearth furnace with an agitation. Generally, the multi-hearth furnace is complicated in construction and expensive, and has a relative small capacity. Accordingly, the type of apparatus as stated above is unsuitable for the large scale production of activated carbon.

An object of the present invention is to provide a process for producing activated carbon directly from an organic material with the simultaneous production of a reduced metal or metal oxide. Another object of the present invention is to provide a process for producing high quality activated carbon at high heat efficiency and yield and at a low cost with the simultaneous production of a reduced metal or metal oxide.

The above stated objects are accomplished by the process of the present invention which comprises carbonizing an organic material by heating at a temperature of at least 200°C while generating combustible distilled gas from the organic material, and activating the carbonized material by bringing it into contact with a material containing at least one metal compound selected from the group consisting of metal oxides, carbonates and hydroxides at a temperature at which said metal compound is reduced by reaction with carbon, and is characterized by charging a mixture of the organic compound and the metal compound-containing material into an internal space of an internal heating rotary furnace through an end thereof, blowing air or oxygen gas into the internal space through an opposite end thereof, burning the distilled gas and carbon monoxide gas generated by the reduction of the metal compound with carbon in the internal space, and uniformly circulating the burnt gas having a temperature of at least 500°C throughout said internal space of said rotary furnace.

The term "organic material" used herein refers to a solid material capable of being carbonized at a temperature of 200°C or higher. Such organic material may be selected from the group consisting of wood, anthracite, usual coal, lignite, brown coal, sub-bitumenus coal, coal waste, forest mill waste, coconut husk, bark waste, chipper waste, saw dust, agricultural waste, seeds of fruits and lignin.

The metal oxide usable for the process of the present invention may be selected from the oxides of iron, copper, lead, nickel, tin, cadmium, zinc, chromium and manganese.

The metal carbonate usable for the process of the present invention may be selected from the carbonates of calcium, magnesium, cesium, sodium, potassium and barium.

Further, the metal hydroxide usable for the process of the present invention may be selected from the hydroxides of iron, copper lead, nickel, tin, cadmium, zinc, chromium, manganese, calcium, magnesium, cesium, sodium, potassium and barium.

The metal compound-containing material may be a metal ore, for example, iron ore which contains iron oxide.

In the process of the present invention, an internal space of an internal heating rotary furnace is charged with a mixture of the organic material and the metal compound-containing material. They may be uniformly mixed preliminarily outside the rotary furnace and, then, fed into the rotary furnace through an end of the rotary furnace or separately fed into the rotary furnace through an end thereof and then, uniformly mixed with each other in the rotary furnace. The amount of the metal compound-containing material to be mixed with the organic material is determined in consideration of the kind of the organic material, the amount of the activated carbon which will be produced from the organic material, the activity required of the activated carbon to be produced and content of the metal compound in the material. Generally, the organic material is determined in an amount of 100 to 1,000% based on the weight of the organic material from which the carbonized material will be produced in an amount necessary for completely direct-reducing the metal compound.

In the initial period of the carbonization air or oxygen gas and a gas or liquid fuel are fed into the internal space of the rotary furnace and burnt therein to heat the organic material to a temperature of at least 200°C at which the organic material is dried and, then, a combustible distilled gas is generated from the organic material. The combustible distilled gas is mixed with the air or oxygen and burnt in the internal space to maintain the internal space at the necessary temperature. When the internal space can be maintained at the necessary temperature by the combustion of the distilled gas, the feed of the fuel may be stopped.

By rotation of the rotary furnace, the organic material, together with the metal compound-containing material, travels from the feed end toward the opposite end (discharge end) of the rotary furnace through the internal space. During the travel, the organic material is passed through a distillation and carbonization zone and an activation zone.

In order to maintain the distillation and carbonization zone and the activation zone at the desired temperature, it is necessary that the distilled gas from the organic material and the carbon monoxide which has been generated in the activation zone, by the reaction detailed hereinafter, are burnt within the internal space of the rotary furnace and the resultant burnt gas having a high temperature is uniformly circulated throughout the internal space.

In order to create uniform circulation of the burnt gas, it is preferable that the internal space of the rotary furnace has a length (L) of 1 to 10 times the diameter (D) thereof. That is, the ratio L/D is in a range of from 1 to 10.

Further, it is desirable that the air or oxygen gas is blown into the internal space through an end thereof opposite the end through which the organic material and the metal-compound-containing material are fed. Such blowing of air or oxygen gas into the internal space having the above-mentioned ratio L/D is very effective for creating the circulation of the burnt gas.

The conventional internal heating rotary furnace has a large ratio L/D, which ranges from 15 to 25 and is unsuitable for the formation of the burnt gas circulation therewithin.

This is because the large length of the internal space tends to form a concurrent flow of the air or oxygen and the burnt gas and the small diameter of the internal space obstructs the formation of a flow of the burnt gas counter to the air or oxygen gas.

The air or oxygen gas may be blown in parallel to the longitudinal axis of the rotary furnace or may be blown towards an inside periphery surface of the rotary furnace. Generally, the latter is preferable to form the uniform circulation of the burnt gas including the air or oxygen gas.

In the case where the metal compound used as the activating agent is a metal oxide as specified hereinbefore, such metal oxide is indirectly reduced by carbonized material at a temperature of at least 500°C, preferably, 700° to 1300°C. That is, a portion of the carbonized material is oxidized to generate carbon monoxide and the metal oxide is reduced by the carbon monoxide in accordance with the following reaction:

$$MmOn + nCO \rightarrow mM + nCO_2 \qquad (I)$$

wherein M represents a metal atom and $m$ and $n$ represent a numeral, respectively. For example, iron (III) oxide is reduced in accordance with the following chemical equation:

$$\tfrac{1}{3}Fe_2O_3 + CO = \tfrac{2}{3}Fe + CO_2 + 1.9 \text{ Kcal} \qquad (I\text{-}a)$$

At the reduction temperature of the metal oxide the abovegenerated carbon dioxide ($CO_2$) is reduced by the reaction with carbon in accordance with the following equation:

$$CO_2 + C = 2CO + 41 \text{ Kcal} \qquad (II)$$

The above reaction results in the activation of the carbonized material, and the resultant carbon monoxide act as a reducing agent for the metal oxide. Accordingly, from Equations (I) and (II) the reaction of the metal oxide with the carbonized material in the activation zone is summarized as follows:

$$MmOn + nC = mM + nCO$$

In the case of the iron (III) oxide, the summarized equation from Equations (I-$a$) and (II) is as follows.

$$\tfrac{1}{3}Fe_2O_3 + \tfrac{2}{3}Fe + CO - 39.1 \text{ Kcal (III)}$$

As the above equation clearly indicates, the reduction of the metal oxide absorbs the large amount of heat of 39.1 Kcal/mole. However, if the carbon monoxide generated above is mixed with air or oxygen gas and burnt in the internal space of the rotary furnace, such combustion results in the production of a large amount of heat in accordance with the following equation:

$$CO + \tfrac{1}{2}O_2 = CO_2 + 68 \text{ Kcal} \qquad (IV)$$

In view of Equations (III) and (IV), it is obvious that the reaction (IV) can sufficiently supply the heat necessary for effecting the reaction (III).

It should be noted that the activation of the carbonized material can be controlled by controlling the reaction (IV), that is, the supply of heat. If the heat generated in the reaction (V) is insufficient for promoting the reaction (III) a gas or liquid fuel is burnt in the internal space of the rotary furnace.

Further, it should be noted that in the activation zone, the carbonized material can be practically protected from the action of air or oxygen fed through the opposite end which is close to the activation zone, because the surface of the carbonized material is covered by a layer of carbon monoxide which is generated by the reaction of the carbonized material with the metal oxide. This carbon monoxide is burnt with the air or oxygen and produces the heat to maintain the internal space at the necessary temperature. In other words, a portion of the carbonized material is consumed not only to reduce the metal oxide with the simultaneous activation of the carbonized material itself, but also to maintain the internal space at the necessary temperature.

In the case where the metal compound is a metal carbonate or hydroxide, it is decomposed at the temperature at which the carbonized material is activated, in accordance with the following chemical equation:

$$Mm(CO_3)n = mMOn/m + nCO_2 \qquad (V)$$

or $$Mm(OH)n = mMOn/2m + n/2H_2O \qquad (VI)$$

For example, in the case of calcium carbonate or hydroxide, the decomposition is as follows.

$$CaCO_3 = CaO + CO_2 - 42.58 \text{ Kcal} \qquad (V\text{-}a)$$

or $$Ca(OH)_2 = CaO + H_2O - 15.58 \text{ Kcal} \qquad (VI\text{-}a)$$

In the above decomposition V-$a$, the theoretical temperature at which the resultant carbon dioxide has a partial pressure of 1 atmosphere is 900°C. Also, in the case of equation (VI-$a$), the theoretical temperature at which the resulting water vapor has a partial pressure of 1 atmosphere is 450°C. Accordingly, at an activating temperature of 550° to 1300°C, the reactions shown below are effected.

$$CO_2 + C = 2CO - 41 \text{ Kcal} \qquad (VII)$$

$$H_2O + C = CO + H_2 - 31.4 \text{ Kcal} \qquad (VIII)$$

That is, the above carbon dioxide or water vapour acts as an activating agent for the carbonized material.

From Equation (V) and (VII), the following equation is summarized.

$$Mn(CO_3)n + nC = mMOn/n + 2nCO \qquad (IX)$$

Also, from Equation (VI) and (VIII), the following equation is summarized.

$$M(OH)n + \tfrac{1}{2}nC + MOn/2 + \tfrac{1}{2}nH_2 + \tfrac{1}{2}nCO \qquad (X)$$

For example, the reaction of the carbonized material with the calcium carbonate and hydroxide, is summarized as follows.

$$CaCO_3 + C = CaO + 2CO - 83.58 \text{ Kcal} \qquad (IX\text{-}a)$$

or $$Ca(OH)_2 + C = CaO + H_2 + CO - 48.98 \text{ Kcal} \qquad (X\text{-}a)$$

That is, to complete the above reactions, a large amount of heat is required. This heat is supplied by burning the resultant carbon monoxide or a mixture of cabon monoxide and hydrogen generated from the above reaction (IX) or (X).

$$2CO + O_2 = 2CO_2 + 136 \text{ Kcal} \qquad (XI)$$

or $$H_2 + CO + O_2 = H_2O + CO_2 + 136.3 \text{ Kcal} \qquad (XII)$$

Generally, the heat generated in the reaction (XI) or (XII) is larger than that necessary for completing the reaction (IX) or (X). If the generated heat is too excessive to maintain the internal space of the rotary furnace at the desired temperature, the amount of air or oxygen gas to be blown into the internal space is lowered. That is, the temperature of the internal space is controlled by controlling the supply of air or oxygen gas.

During the activation, the carbonized material is covered by the layer of carbon monoxide or a mixture of carbon monoxide and hydrogen, and protected from the direct reaction with the air or oxygen gas. The resultant activated carbon is separated from the reduced metal or metal oxide by way of screening, gravity separation or magnetic separation.

The following examples are presented for the explanation of the present invention but not the limitation thereof.

EXAMPLE 1

An internal heating rotary furnace including an internal space of 1.8 m diameter and 18 m length, was used for producing activated carbon and reduced iron.

158 Kg of anthracite including 7.8% by weight of volatile matter, 80.9% by weight of fixed carbon and 3.0% by weight of ash and 315 kg of iron ore including 62.8% weight of total iron per hour were mixed and charged into the above internal space of the rotary furnace through a feed end thereof. Air was blown at a flow rate of 270 m³/hour, into the internal space through an inlet disposed at an end thereof opposite the above-mentioned feed end and at an angle of 1.5 degrees to the longitudinal axis of the rotary furnace. By burning the distilled gas from the anthracite and carbon monoxide generated from the activation of the carbonized anthracite, the internal space was maintained at an approximately 1000°C. During the residence time of about 6 hours, the anthracite was converted to activated carbon and the iron ore to reduced iron. The resultant activated carbon and the reduced iron was discharged from the opposite end of the internal furnace and cooled in a non-oxidizing atmosphere. Thereafter, the activated carbon was separated from the reduced iron by magnetic separation. The activated carbon was in an amount of 54 kg/hour and the reduced iron in an amount of 233 kg/hour (content of metallic iron = 92% by weight). The activated carbon having a size of 0.5 to 2.3 mm was subjected to an evaluation of absorption capacity. The absorption capacity of the activated carbon was tested in accordance with Japanese Industrial Standard (JIS) K-1470. That is, 1 g of the activated carbon was suspensed in 190 ml of an aqueous of 1000 p.p.m. of Methylene Blue at 25°C. 1 hour after the suspending, the aqueous solution was completely decolorized.

EXAMPLE 2

The same operations as in Example 1 were repeated using an internal heating rotary furnace having a internal space of 1.6 m diameter and 9 m length. The activated carbon and the reduced iron were produced in amounts of 21.5 kg/hour and 93 kg/hour, respectively. The activated carbon had the same absorption capacity as that in Example 1.

EXAMPLE 3

The same operations as in Example 1 were repeated using lateritic ore which contains nickel oxide and iron oxide, instead of the iron ore. The nickel oxide was charged in an amount of 410 kg/hour. The activated carbon and the reduced ferro-nickel were obtained in amounts of 46 kg/hour and 305 kg/hour, respectively. The activated carbon had the same absorption capacity as that in Example 1.

EXAMPLE 4

A brown coal char including 4.2% by weight of volatile matter, 93.0% by weight of fixed carbon and 2.8% by weight of ash in an amount of 130 kg/hour was mixed with lime including 96% by weight of calcium carbonate, in an amount of 420 kg/hour. The mixture was charged into an internal heating rotary furnace having an internal space of a 1.8 m diameter and a 18 m length. For the combustion of the distilled gas and carbon monoxide, air was blown at a flow rate of 146 m³/hour into the internal space at an angle of 1.5 degrees to the longitudinal axis of the rotary furnace. The burnt gas was uniformly circulated in the internal space and maintain at a temperature of 970°C. Activated carbon and calcium oxide were produced in rates of 52 kg/hour and 235 kg/hour. The activated carbon had the same absorption capacity as that in Example 1.

EXAMPLE 5

The same procedures as in Example 4 were repeated using 91 kg of the brown coal char and 280 kg/hour of calcium hydroxide at a temperature 750°C. Activated carbon and calcium oxide were produced in rates of 38 kg/hour and 164 kg/hour, respectively.

What we claim is:

1. A process for producing activated carbon which comprises:

a. charging an internal space of an internally heated rotary furnace, said furnace having a charge inlet at one end thereof, an opposed discharge outlet at the other end thereof and a ratio of length to diameter of from 1:1 to 10:1, with a mixture of an organic material capable of being carbonized at a temperature of 200°C or higher, and a material containing therein at least one metal compound capable of reacting with carbonized organic material at a temperature of at least 500°C to form activated carbon, said metal compound being selected from the group consisting of metal oxides, carbonates and hydroxides, through the inlet of said rotary furnace;

b. rotating said rotary furnace to cause said mixture of said organic material and said metal compound-containing material to travel from the feed end to the opposite discharge end of said rotary furnace through a distillation and carbonization zone and an activation zone in said internal space of said rotary furnace;

c. blowing air or oxygen gas into said internal space of said rotary furnace from and through said opposite discharge end thereof in a direction which is parallel to the longitudinal axis of said rotary furnace or inclined at an angle from said axis towards an inside periphery surface of said rotary furnace;

d. heating said mixture in said distillation and carbonization zone at a temperature of at least 200°C to carbonize said organic material in said mixture and to generate from said organic material combustible distilled gas;

e. heating the resulting mixture containing said carbonized material in contact with said metal compound in said activation zone at a temperature of at least 500°C to activate said carbonized material, to reduce said metal compound and to generate carbon monoxide which, together with said distilled gas serves as the sole fuel used to generate heat in said process;

f. contacting said distilled gas and carbon monoxide with said blown air or oxygen at a temperature of at least 500°C to burn said distilled gas and carbon monoxide;

g. whereby the burnt gas including said air or oxygen gas is uniformly circulated throughout said internal space of said rotary kiln by said blowing of said air or oxygen gas to provide the heat required by said heating steps (d) and (e).

2. A process as claimed in claim 1, wherein said organic material is selected from the group consisting of wood, anthracite, usual coal, lignite, brown coal, subbitumenus coal, coal waste, forest mill waste, coconut husk, bark waste, chipper waste, saw dust, agricultural waste, seeds of fruits and lignin.

3. A process as claimed in claim 1, wherein said metal oxide is selected from the oxides of iron, copper, lead, nickel, tin, cadmium, zinc, chromium, and manganese.

4. A process as claimed in claim 1, wherein said metal carbonate is selected from the carbonates of calcium, magnesium, barium, cesium, sodium and potassium.

5. A process as claimed in claim 1, wherein said metal hydroxide is selected from hydroxides of iron, copper, lead, nickel, tin, cadmium, zinc, chromium, manganese, calcium, magnesium, barium, cesium, sodium and potassium.

6. A process as claimed in claim 3, wherein said oxide is iron ore.

7. A process as claimed in claim 1, wherein said metal compound-containing material is lime.

8. A process as claimed in claim 1, wherein said air is blown in parallel to the longitudinal axis of said rotary furnace.

9. A process as claimed in claim 1, wherein said air is blown towards an inside periphery surface of said rotary furnace.

10. A process as claimed in claim 1, wherein the temperature in said activation zone is between 700° and 1300°C.

11. A process as claimed in claim 1, wherein said organic material is in an amount of up to 1000% of the weight of the organic material required to provide the carbon necessary for completely direct-reducing said metal compound.

12. A process as claimed in claim 1, wherein, prior thereto, a fuel is fed into said internal space of said rotary furnace and burnt therein until the internal space of the furnace can be maintained at the said temperature of at least 200°C by the combustion of the distilled gas and carbon monoxide and then stopping the feed of said fuel.

13. A process as claimed in claim 1, wherein the resultant activated carbon is separated from the reduced metal by way of gravity separation or magnetic separation.

* * * * *

UNITED STATES PATENT OFFICE
CERTIFICATE OF CORRECTION

Patent No. 3,950,267  Dated April 13, 1976

Inventor(s) Hideo Arakawa, et al

It is certified that error appears in the above-identified patent and that said Letters Patent are hereby corrected as shown below:

Column 5, line 29, " $1/3\ Fe_2O_3 + 2/3\ Fe + CO - 39.1$ Kcal" should read -- $1/3\ Fe_2O_3 + C = 2/3\ Fe + CO - 39.1$ Kcal --.

Column 6, line 50, "cabon" should read -- carbon --.

Column 7, line 13, "Kg" should read --kg --.

Column 7, line 16, "62.8%" should read -- 68.2% --.

Column 7, before "weight" insert -- by --.

Signed and Sealed this

Twenty-fourth Day of August 1976

[SEAL]

Attest:

RUTH C. MASON
*Attesting Officer*

C. MARSHALL DANN
*Commissioner of Patents and Trademarks*